United States Patent
Bookman et al.

(10) Patent No.: US 9,804,865 B2
(45) Date of Patent: Oct. 31, 2017

(54) MICROVISOR RUN TIME ENVIRONMENT OFFLOAD PROCESSOR

(71) Applicant: Sphere 3D Corporation, Mississauga (CA)

(72) Inventors: Peter G. Bookman, Huntsville, UT (US); Giovanni J. Morelli, Mississauga (CA)

(73) Assignee: Sphere 3D Corporation, Mississauga (CA)

( * ) Notice: Subject to any disclaimer, the term of this patent is extended or adjusted under 35 U.S.C. 154(b) by 0 days.

(21) Appl. No.: 14/720,553

(22) Filed: May 22, 2015

(65) Prior Publication Data
US 2015/0339128 A1    Nov. 26, 2015

Related U.S. Application Data

(60) Provisional application No. 62/002,513, filed on May 23, 2014.

(51) Int. Cl.
*G06F 9/46* (2006.01)
*G06F 9/445* (2006.01)
*G06F 9/50* (2006.01)

(52) U.S. Cl.
CPC ............... *G06F 9/445* (2013.01); *G06F 8/61* (2013.01); *G06F 9/5005* (2013.01)

(58) Field of Classification Search
None
See application file for complete search history.

(56) References Cited

U.S. PATENT DOCUMENTS

| 8,418,230 | B1* | 4/2013 | Cornelius | G06F 15/80 712/1 |
| 8,423,990 | B2* | 4/2013 | Chen | G06F 8/63 713/1 |
| 8,434,093 | B2 | 4/2013 | Larimore et al. | |
| 9,043,784 | B2* | 5/2015 | Dunning | G06F 9/45558 718/1 |

(Continued)

OTHER PUBLICATIONS

Bromium, "Bromium vSentry" [online], Jun. 11, 2013 retrieved on Jul. 15, 2015. Retrieved from the Internet: <http://www.bromium.com/company/press-releases/bromium %C2 % AE-introduces-vsentry-20-endpoint-security.html>.

(Continued)

*Primary Examiner* — Gregory A Kessler
(74) *Attorney, Agent, or Firm* — Knobbe, Martens, Olson & Bear, LLP

(57) ABSTRACT

Embodiments here include systems and methods for running an application via a microvisor processor in communication with a memory and a storage is disclosed. For example, one method includes installing an application. The method also includes identifying an operating system that the application is configured to execute within. The method also includes identifying a resource required by the application to execute, wherein the resource is part of the operating system. The method also includes identifying a location of the resource in the storage. The method also includes retrieving the resource from the storage. The method also includes bundling the application and the resource in the memory. The method also includes executing the application using the resource.

22 Claims, 4 Drawing Sheets

(56) References Cited

U.S. PATENT DOCUMENTS

2008/0127170 A1* 5/2008 Goldman ................. G06F 8/61
717/174

OTHER PUBLICATIONS

Patel et al., "Embedded Hypervisor Xvisor: A comparative Analysis", 2015 23rd Euromicro International Conference on Parallel, Distributed and Network-Based Processing, pp. 682-691 [online], Mar. 4-5, 2015 [retrieved on Jul. 15, 2015(Jul. 15, 2015)]. Retrieved from the Internet: <http://ieeexplore.ieee.org/stamp/stamp.jsp?tp=&arnumber=7092793>.
IQBAL et al., "An Overview of Micro kernel, Hypervisor and Microvisor Virtualization Approaches for Embedded Systems"[online], 2009 [retrieved on Jul. 15, 2015. Retrieved from the Internet: <http://citeseerx.ist.psu.edu/viewdoc/download?doi=10. I .1.460.4188&rep=rep 1 &type=pdf>.
International Search Report and Written Opinion dated Aug. 31, 2015 for International Application No. PCT/CA2015/000331.

* cited by examiner

MICROVISOR RUN TIME ENVIRONMENT OFFLOAD PROCESSOR

RELATED APPLICATIONS

Any and all applications for which a foreign or domestic priority claim is identified in the Application Data Sheet as filed with the present application are hereby incorporated by reference under 37 CFR 1.57.

BACKGROUND

Field of the Invention

This application relates to the field of computing processors to run operating systems, applications and other programs.

Description of the Related Art

It has been difficult for various hardware products to interact with software with which they may not be compatible. Various hardware, core operating system functions, and abilities which applications were specifically written for become out of date, unavailable, and problematic to the applications themselves. The need to provide an abstraction based model for application, desktop and data access independent of a particular operating environment has become a prevalent model for network delivery of applications, desktops, data, and services. Software based approaches put the functions of emulation, abstraction, and running entirely on the Central Processing Unit (CPU). Software defined virtual resources are prevalent in common cloud and virtualized resources relying entirely on the core Operating System (OS) and the CPU to provide the resources desired.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

Generally described, aspects of the present disclosure relate to a hardware based approach for translation, emulation, and virtualization from software defined abstracted application requirements. This hardware based approach improves perceived performance while lowering the utilization of shared hardware such as a CPU, memory, and busses which are used for providing the same functions in software. By moving functions of the core OS down from software into hardware, many bottlenecks may be overcome. These bottlenecks may include bottlenecks emerging in the virtualization space where software can define emulated resources such as compute, storage, and available resources.

In a particular embodiment, a method for running (e.g. execute) an application via a microvisor processor in communication with a memory and a storage is disclosed. The method includes installing an application. The method also includes identifying an operating system that the application is configured to execute within. The method also includes identifying a resource required by the application to execute, wherein the resource is part of the operating system. The method also includes identifying a location of the resource in the storage. The method also includes retrieving the resource from the storage. The method also includes bundling the application and the resource in the memory. The method also includes executing the application using the resource.

In a particular embodiment, a system including a memory configured to store an application is disclosed. The system also includes a storage configured to store a resource, wherein the resource is part of an operating system and is required by the application to execute. The system also includes a processor in communication with the memory and the storage. The processor is configured to at least: store the application in the memory, identify the resource, retrieve the resource from the storage, bundle the application and the resource in the memory, and execute the application using the resource.

In a particular embodiment, a computer-readable, non-transitory storage medium storing computer executable instructions that, when executed by one or more computer systems, configure the one or more computer systems to perform operations is disclosed. The operations include installing an application. The operations also include identifying an operating system that the application is configured to execute within. The operations also include identifying a resource required by the application to execute, wherein the resource is part of the operating system. The operations also include identifying a location of the resource in a storage. The operations also include retrieving the resource from the storage. The operations also include bundling the application and the resource in a memory. The operations also include executing the application using the resource.

In a particular embodiment, a method for running an application at a computer is disclosed. The method includes receiving an application request for the application at the computer from a user device. The user device includes a device processor and a device memory. The computer includes a host memory for storing a host operating system and a host processor configured for operating the host operating system. The method further includes communicating with a resource library using the computer, the resource library defining one or more resources required for running the application. The method further includes identifying, using the computer, a set of resources required for running the requested application from the resource library. The set of resources includes at least one resource required for an application operating system to support the requested application. The application operating system is an operating system operable for running the requested application, where the application operating is different than the host operating system. The method further includes running, at the computer, the requested application with the set of resources.

In a particular embodiment, a system is disclosed. The system includes at least one storage component for storing, at least, a host operating system and a resource library defining one or more resources required for running an application. The system further includes a host processor configured for operating the host operating system. The host processor is configured to receive an application request for the application from a user device. The host processor is further configured to identify, from the resource library, a set of resources required for running the application, the set of resources comprising at least one resource required for an application operating system to host the application, where the application operating system is an operating system operable for running the application. Also, the application operating system is different than the host operating system. The host processor is further configured to run the requested application with the identified set of resources.

In a particular embodiment, a method for running an application is disclosed. The method is performed via a microvisor processor in communication with a central processing unit, a memory and a storage. The method includes installing an application. The method also includes identifying which operating system the application is designed to run on. The method also includes identifying which resources the application needs to run. The method also includes identifying a location of the identified resources in the storage. The method also includes retrieving the identified resources. The method also includes bundling the application and the resources in the memory. The method also includes executing the application using the resources.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
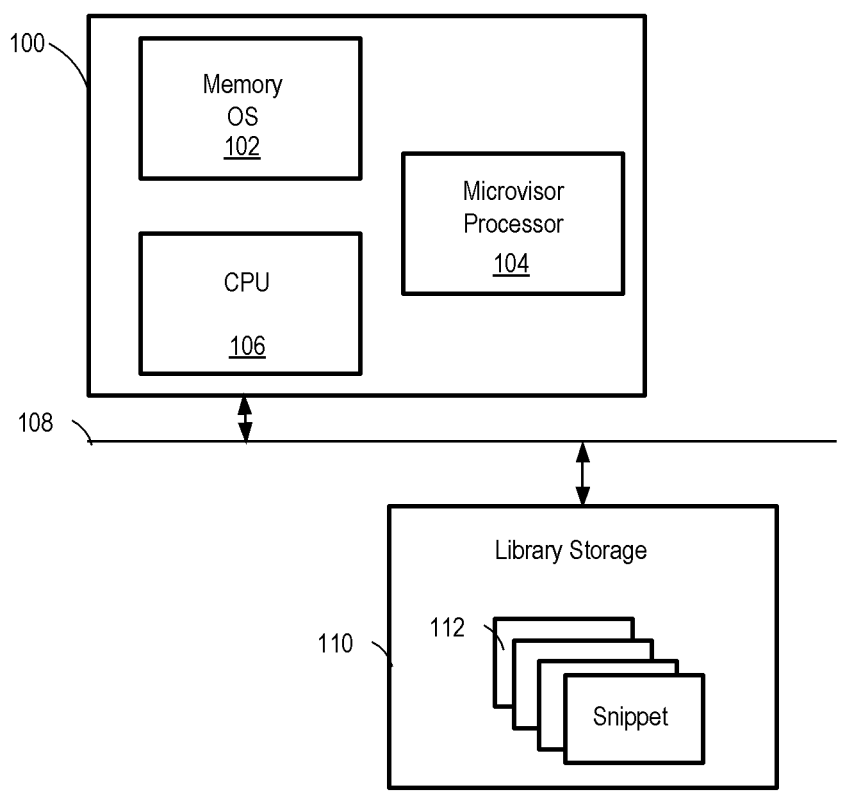
FIG. 1 is an example architecture diagram according to certain embodiments described herein.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

The use of multiple programs and operating systems with multiple hardware devices can cause problems with software compatibility. One way to deal with incompatibility issues is through the use of emulators such as hypervisors and other virtualization technologies. Such systems may emulate entire operating systems (OS) to run software on the OS that a particular program is configured for. But such systems can be cumbersome for the hardware to implement and can introduce multiple layers of software which can slow the execution of the application.

According to some embodiments, devices can be configured to utilize and natively run applications. Applications may be broadly used to describe digital content or software. This can be done through the use of a microvisor processor chip, which may offload run time environments so that applications may execute with the proper resources but without loading or emulating an entire operating system (OS).

In a hypervisor example, the hypervisor may be used to run a virtual machine for an application to execute. The hypervisor may run the virtual machine by emulating hardware, serializing and cuing data, and running an OS as part of a virtual, non-native environment for applications.

In a microvisor example, the microvisor can retrieve and run only the specific pieces of an OS (for example, Windows server, Linux, or any other OS) as necessary to launch and run a particular application. Those specific pieces can be a resource such as (but not limited to) code snippets, libraries, run time libraries (RTLs), dll files, kernels, and files. In so doing, the application is able to interact with the hardware microvisor processor and not have to interact with multiple other layers of software used when running the application in a virtual machine. This microvisor processor may therefore provide a more efficient way to run an application.

In short, using the example embodiments described here, a system may be able to utilize applications that run on different OSs without having to load an entire OS for an application. In other words, if the application calls for running in Windows, Android, Linux, iOS, or any other OS, the microvisor can find and bundle just the resources (for example, snippets, kernels, or RTLs) needed to operate the specific application. In such a way, any type of resource from any OS could be utilized to run any application, without requiring loading an entire OS for the application. The result can be a new "dynamic OS" that is capable of natively running applications configured to run on different traditional OSs through this microvisor processor.

Furthermore, although resources described herein may be described in the context of resources associated with an OS, resources not associated with an OS may be utilized as required in different applications in accordance with different embodiments. For example, the microvisor may be used to emulate physical processors instead of OSs. Thereby, any type of environment can be emulated, not limited to an OS environment as described herein.

An example of how a microvisor may be arranged is illustrated in FIG. 1. In FIG. 1 the computer 100 is shown with a central processing unit (CPU) 106, a memory running an OS 102, and a microvisor processor chip 104. In certain examples, the microvisor 104 may be located elsewhere and not necessarily on the same computer as the CPU 106. In such examples, the microvisor 104 may need a communication channel of its own to communicate with the CPU 106 and may even have its own memory. In the example of FIG. 1, the microvisor 104 and the CPU 106 are found on the same piece of computer hardware.

Figure 4:
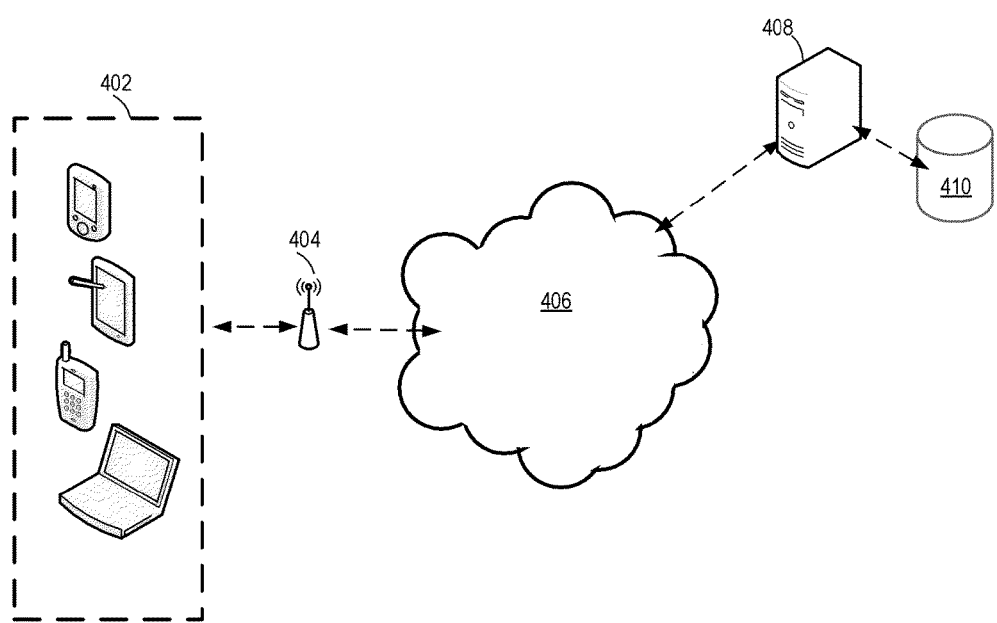
FIG. 4 is an example network diagram showing remote storage of resources according to certain example embodiments described herein.

The computer 100 is configured to interact with storage over a communications channel 108. In this example, the communications channel 100 is a bus, but could be any kind of network, cable, wireless, or any kind of communications channel that allows data to be transferred. In certain examples, the communications channel is a network and/or the Internet as described in FIG. 4.

The library storage 110 is where resources, such as snippets 112 in the illustrated embodiment, are stored. In some examples, the storage 110 is the cache memory of the microvisor processor 104. In certain examples, the storage 110 is a separate database-like storage such as networked storage, or any other kind of storage.

In certain embodiments, resources may include (or be part of) a library such as a run time library (a set of low-level routines that may be used by a complier to invoke behaviors of a runtime environment), a kernel (a program that manages I/O (input/output) requests for electronic hardware components), snippets (a set of reusable code), a file, or any other kind of resource to allow an application to run. Further examples of resources could include runtime libraries of operating systems and emulated resources of underlying hardware and drivers which an application uses to run. For example, a Windows XP application will use resources including the runtime libraries, kernel, and other resources which are normally supplied by Windows XP (developed by Microsoft Corporation headquartered in Redmond, Wash.) running on native hardware or emulated hardware.

Figure 2:
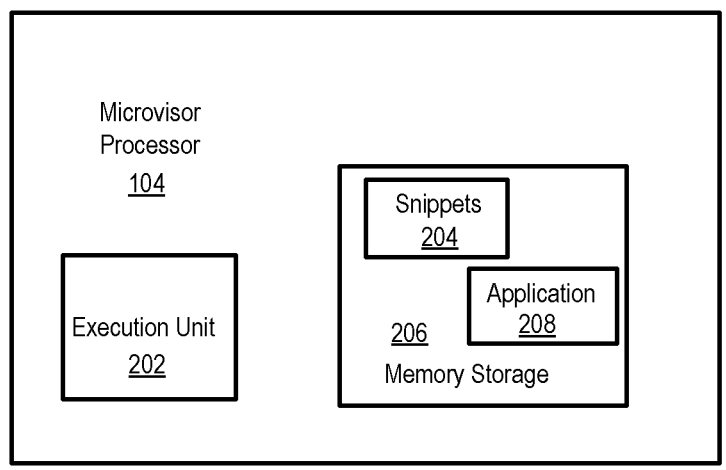
FIG. 2 is another example architecture diagram of a microvisor processor according to certain embodiments described herein.

FIG. 2 shows an example of the microvisor processor chip 104 as found in FIG. 1. In this figure, the microvisor processor 104 is shown to include an execution unit 202. The execution unit 202 may be a processor or any kind of execution device.

The microvisor processor example also includes a memory storage 206. The memory storage 206 includes the application 208 (which is the application to be run) along with the snippets 204 pulled from the storage 110 as shown in FIG. 1. As discussed further in connection with FIG. 3, the microvisor processor 104 may bundle the application 208 with the snippets 204 (or another resource) so that the application may run natively on the microvisor processor 104.

In this way, the microvisor processor 104 is able to execute the application 208 using the resources (for example, the snippets 204) needed to launch and run the application 208 in the OS environment for which the application 208 was designed.

When an application is loaded, the microvisor processor 104 can identify which OS the application 208 is configured to run on and any resources (for example, any snippets, RTLs, kernels and/or file systems) used to run the application 208. For example, the microvisor 104 processor may query a relational database (not illustrated) for an identifier of the resources and/or an identifier the operating system that the application 208 is configured to run on. In certain embodiments, the identifier of the operating system (and in further embodiments also the identifier of the application) may be used on the relational database to query for the identifier of the resources required for the application 208 to run. The relational database may be stored and accessed locally (for example in the memory storage 206) or may be stored in the storage 110 accessible via the bus 108 or other storage accessible over a network.

In certain embodiments, the microvisor 104 may allow the application 208 to query for the resources used by the application 208 to run. Then, the microvisor 104 may receive the results of the application's 208 queries to determine which resources (for example, snippets, RTLs and/or kernels) the application 208 needs to run. For example, the application 104 may send the identifier of the resources and/or the identifier of the operating system that the application 208 is configured to run on to the microvisor 104.

In such a way, the microvisor 104 may determine which resources are needed for the application 208. Then, after the microvisor processor 104 identifies the resources used in the application, the microvisor processor 104 can identify where the resources are located. In certain embodiments, the microvisor processor 104 may identify the locations of the resources by querying the relational database using the identifier(s) of the resources for the locations of the resources. The microvisor processor 104 can retrieve those resources for use with the application 208, bundle them with the application 208 and run the application 208 using the microvisor processor's 104 own memory 206. By bundling the resource with the application 208, the application 208 can run natively on the operating environment provided by the microvisor processor chip 104. The application 208 can then interact directly with the hardware (such as the execution unit 202) of the microvisor processor chip 104.

The microvisor processor 104 may also catalog the information related to the application 208 so the microvisor processor 104 can quickly access the resources (for example, RTLs and kernels) when the application is loaded in a future session. Once such information is cataloged, the microvisor processor 104 may more quickly load the resources as the microvisor processor would not need to identify and locate the same resources in a manner as if the resources were not previously identified and located.

The retrieval of resources (for example, RTLs) can take place from a database or database-like environment. In certain examples, the resources may be stored in the library storage 110. In certain examples, the resources may be stored on a cloud based storage or a local database.

Figure 3:
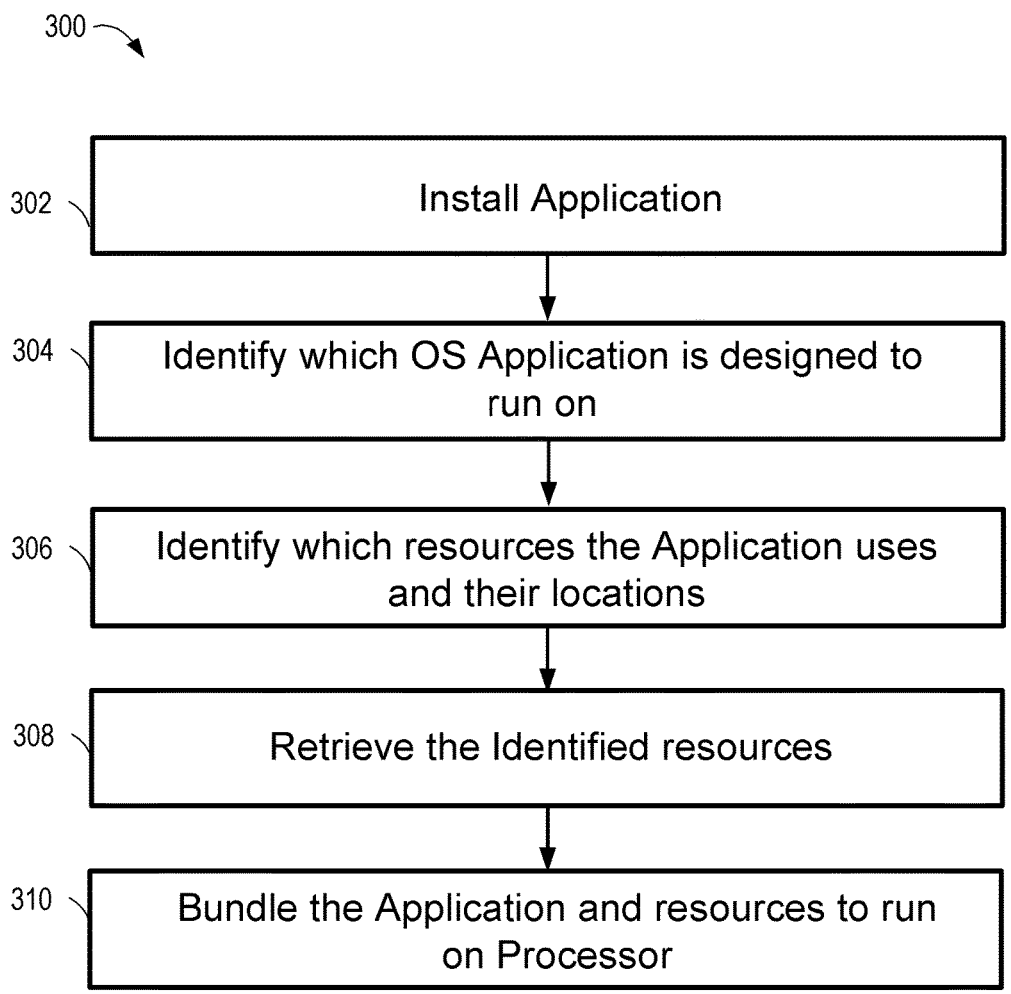
FIG. 3 is an example flow diagram for the steps the microvisor processor may take according to some embodiments described herein.

An example of this process is shown on FIG. 3 as an illustrative method 300 that may be implemented by the microvisor processor chip 104 using the execution unit 202. The illustrative method 300 begins at block 302, where the application 208 is installed using the microvisor processor 104. The application may be installed by loading the executable code of the application into the memory storage 206.

At block 304 the microvisor processor 104 identifies which OS the application is designed to run on. As discussed above, the microvisor processor 104 may identify the appropriate OS by querying the relational database using the identifier of the application.

At block 306, the microvisor processor 104 identifies which resources (such as which snippets 112 or RTLs) the application uses along with the locations for these resources in storage (for example by identifying the library storage 110 that stores the snippets 112). These resources may be an individual resource (for example, as individual snippets) and/or combinations of different resources (for example, as snippets along with a kernel).

At block 308, the microvisor processor 104 retrieves the identified resources. For example, the identified resources may be retrieved by fetching the identified resources from the library storage 110 and storing the identified resources in the memory storage 206.

At block 310, the microvisor processor 104 bundles the application 208 and the resources in the memory 206 to run on the microvisor processor 104. Bundling the application 208 and the resources includes associating the resource with the application 208 such that the application 208 calls the resource while the application 208 is executing.

In certain examples, the resources (for example, the snippets 204) which the microvisor uses to run the application 208 may be stored in an off-site location, separate and remote from the main CPU 106 and/or microvisor processor 104. For example, in FIG. 4, mobile devices 402 are in communication with the a network 406 (for example, the Internet) via a wireless access point 404. In this example, a server 408 in communication with a storage 410 that stores the resources (for example, the libraries, snippets, or kernels) which the microvisor may use to run the application 208. By storing the resources in a central location, many devices 404 are able to call the resources at a central location without storing the resources locally on each of the devices 404. The example of a network 406 and a mobile device 402 are merely exemplary and not intended to be limiting. Any kind of computing device, network, or storage can be used.

A microvisor system may be beneficial where there may be many applications that run across a diverse fabric. In other words, using the microvisor processor 104 to execute applications that use different resources (for example, RTLs) can reduce the amount of processing on the hardware of a system by reducing the software (for example, virtual machines) running on the hardware. The more emulated resources which are utilized during networking, the more the CPU and other shared resources are taxed. As scaling takes place, being able to provide offloading with the microvisor processor may improve the performance of the entire networked system. For example, offloading provided by the microvisor processor may allow for more applications to run while using the same resources when compared with a system that does not use the microvisor processor.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for running an application comprising,
    via a microvisor processor in communication with a memory and a storage,
        installing an application configured to execute on a specific operating system;
        identifying the operating system that the application is configured to execute within, based upon an identifier of the application;
        identifying a resource required by the application to execute, wherein the resource is part of the operating system;
        identifying a location of the resource in the storage;

retrieving the resource from the storage;
bundling the application and the resource in the memory;
initializing a portion of the operating system, the portion including the resource; and
executing the application using the resource.

2. The method of claim 1, wherein the resource is at least one selected from the group consisting of a run time library, a snippet, and a kernel.

3. The method of claim 2, wherein the resource is less than an entirety of the operating system.

4. The method of claim 1, wherein installing an application comprises loading the application into the memory.

5. The method of claim 1, wherein the identifying the resource comprises querying for an identifier of the resource from a data store based upon the identifier of the application.

6. The method of claim 1, wherein the identifying the resource comprises:
the application querying for an identifier of the resource from a data store, and
the application sending the identifier of the resource to the microvisor processor.

7. The method of claim 1, wherein the identifying the location of the resource in the storage comprises querying the location of the resource from a data store based on an identifier of the resource.

8. The method of claim 7, further comprising, via the microvisor processor, storing the location of the resource and the identifier of the resource in the memory.

9. The method of claim 1, wherein the microvisor processor is in communication with the storage over a network.

10. The method of claim 1, wherein the bundling the application and the resource comprises associating the resource with the application such that the application calls the resource while the application is executing.

11. The method of claim 1, comprising, via the microvisor processor, communicating with a central processing unit configured to host other applications within a different operating system than the operating system that the application is configured to execute within.

12. The method of claim 1, comprising:
via the microvisor processor,
installing a second application;
identifying a second operating system that the second application is configured to execute within, the second operating system different than the operating system;
identifying a second resource required by the second application to execute, wherein the second resource is part of the second operating system and is different than the resource;
bundling the second application and the second resource in the memory;
initializing less than an entirety of the second operating system, the less than an entirety of the second operating system including the second resource, wherein said initializing of less than the entirety includes skipping initialization of a portion of the second operating system, wherein the second resource is not included in the portion of the second operating system; and
executing the second application using the second resource.

13. A system, comprising:
a memory configured to store an application configured to execute on a specific operating system;
a storage configured to store a resource, wherein the resource is part of the operating system and is required by the application to execute;
a processor in communication with the memory and the storage, the processor configured to at least:
store the application in the memory,
identify the operating system based upon an identifier of the application,
identify the resource,
retrieve the resource from the storage,
bundle the application and the resource in the memory,
initialize a portion of the operating system, the portion including the resource, and
execute the application using the resource.

14. The system of claim 13, wherein the resource is less than an entirety of the operating system.

15. The system of claim 13, wherein the resource is at least one selected from the group consisting of a run time library, a snippet, and a kernel.

16. The system of claim 13, further comprising a central processing unit configured to host other applications within a different operating system than the operating system that the application is configured to execute within.

17. The system of claim 16, wherein the processor communicates with the central processing unit over a bus.

18. A computer-readable, non-transitory storage medium storing computer executable instructions that, when executed by one or more computer systems, configure the one or more computer systems to perform operations comprising:
installing an application configured to execute on a specific operating system;
identifying the operating system that the application is configured to execute within, based upon an identifier of the application;
identifying a resource required by the application to execute, wherein the resource is part of the operating system;
identifying a location of the resource in a storage;
retrieving the resource from the storage;
bundling the application and the resource in a memory;
initializing a portion of the operating system, the portion including the resource; and
executing the application using the resource.

19. The computer-readable, non-transitory storage medium of claim 18, wherein the resource is at least one selected from the group consisting of a run time library, a snippet, and a kernel.

20. The computer-readable, non-transitory storage medium of claim 18, wherein the resource is less than an entirety of the operating system.

21. A method for running an application configured to execute on an application operating system at a computer, the method comprising:
receiving an application request for the application at the computer from a user device, the user device comprising a device processor and a device memory, the computer comprising a host memory for storing a host operating system and a host processor configured for operating the host operating system that is different from the application operating system;
communicating with a resource library using the computer, the resource library defining one or more resources required for running the application;
identifying, using the computer, a set of resources required for running the requested application from the resource library, the set of resources comprising at least one resource required for the application operating system to support the requested application;

initializing a portion of the application operating system, the portion including the at least one resource; and running, at the computer, the requested application with the set of resources.

22. A system comprising:

at least one storage component for storing, at least, a host operating system and a resource library defining one or more resources required for running an application configured to execute on an application operating system; and a host processor configured for operating the host operating system different from the application operating system, the host processor being further configured to:
- receive an application request for the application from a user device,
- identify, from the resource library, a set of resources required for running the application, the set of resources comprising at least one resource required for the application operating system to host the application;
- initialize a portion of the application operating system, the portion including the at least one resource; and
- run the requested application with the identified set of resources.

* * * * *